United States Patent [19]
Perchak

[11] Patent Number: 5,896,475
[45] Date of Patent: Apr. 20, 1999

[54] THIN LIGHTGUIDE TARGET FOR LASER ALIGNMENT

[75] Inventor: Robert M. Perchak, Dayton, Ohio

[73] Assignee: Mirage Development, Ltd., Dayton, Ohio

[21] Appl. No.: 08/897,580

[22] Filed: Jul. 21, 1997

[51] Int. Cl.[6] .................................................. G02B 6/32
[52] U.S. Cl. .................................... 385/33; 356/138
[58] Field of Search ........................... 385/27.3, 31–33, 385/39; 356/138, 401; 250/548, 491.1; 359/15

[56] References Cited

U.S. PATENT DOCUMENTS

| | | | |
|---|---|---|---|
| 4,558,225 | 12/1985 | Gotou et al. | 250/491.1 |
| 5,216,729 | 6/1993 | Berger et al. | 385/31 |
| 5,596,413 | 1/1997 | Stanton et al. | 356/401 |
| 5,710,647 | 1/1998 | Perchak | 359/15 |

*Primary Examiner*—Akm E. Ullah
*Attorney, Agent, or Firm*—Joseph G. Nauman

[57] ABSTRACT

The target structure of this invention is comprised of a thin optically transparent lightguide sheet, preferably two sheets bonded together with flat sides. The thin sheet material is chosen to make a good pocket-size lightguide and provide an adequate tradeoff to cost, manufacturing ease, and internal reflective loss, and may be colored to provide an optical filter enhancing contrast of the viewed image by rejecting unwanted light. At the entrance edge of the target are side-by-side formations generating optically the lens and axicon function, and separately the reference lens function. The exit edges of the sheets are either flat and perpendicular to the faces, or at such an angle as to direct images at a prescribed angle with respect to the face of the sheet(s). The entrance edge of the one sheet is formed with a curve to produce the optical lens and axicon functions, the shape of which can be chosen to enhance any difference occuring between the images when the incoming beam is not on center. The other sheet is similarly designed to the lens function that produces a single image reference line. The exit ends of each lightguide are made in several ways depending on where the images are to be viewed. The output ends may be viewed from the edge of the target, as for drop ceiling rail alignment, and the images appear directly on the ends.

13 Claims, 3 Drawing Sheets

THIN LIGHTGUIDE TARGET FOR LASER ALIGNMENT

CROSS-REFERENCE TO RELATED APPLICATION

This invention relates to laser alignment systems such as disclosed in U.S. patent applications Ser. No. 08/520,853 and Ser. No. 08/520,852 (now U.S. Pat. No. 5,710,647 issued Jan. 20, 1998) both filed Aug. 30, 1995, and to an improved passive portable target for such systems.

BACKGROUND OF THE INVENTION

In such systems, a symmetric leveling laser beam, which may sweep, or scan, or be directed along a desired path, is caused by optical means in a portable target to be separated into at least two focused images. Displacement of the target relative to the incoming beam causes the images to be unequal. When the target is on the optical center of the beam the images are equivalent Prior inventions assigned to the same assignee as this application typically use a lens function for focusing the incoming light, an axicon function for separating the beam into at least two parts, and a diffusing surface, e.g. a screen, for viewing the images. This invention incorporates the same optical functions into a more easily manufactured optical structure.

SUMMARY OF THE INVENTION

The target structure of this invention is comprised of a thin optically transparent sheet, such as acrylic or styrene or polycarbonate, preferably two such sheets that are bonded together, to form the invention. The sheet material is chosen to be thin, about ¼ to ⅛ inch thick, so as to make a good lightguide and provide an adequate tradeoff to cost, manufacturing ease, internal reflective loss, etc. The material may be dyed or colored in order to provide an optical filter to enhance the contrast of the viewed image by rejecting unwanted light. Other thicknesses of transparent materials will likewise work. The sheets may be of a convenient small size, as to form a unit that can fit into a shirt pocket.

At one end (the entrance end) of the target there are side-by-side formations designed to generate optically the lens and axicon function, and separately the lens function. In the case of using two almost identical sheets, one sheet has an edge formed to generate the lens/axicon function, thus producing spaced apart images from the same incoming beam, and the other sheet is formed to generate the lens function which generates a single reference image adjacent the spaced apart images. The exit edges of these sheets are either flat and perpendicular to the faces, or at some angle which would direct the images at some angle with respect to the face of the sheet(s). The entrance edges where light will enter the target are formed in such a way as to create a curve in order to produce the optical lens function. The shape of the curve is designed to generate the desired image shape and quality.

Furthermore, the shape of the curve, in the case of the one sheet, can be chosen to enhance the difference that occurs between the images when the incoming beam is not on center. One way to determine the shape of this curve is through the use of one of various optical design programs that describe curves by polynomial expansions.

The other sheet is similarly designed to optically generate the lens function that produces a single image reference line.

The output or exit ends of each sheet, or lightguide, are made in several ways depending on where the images are to be viewed. For example the output ends may be viewed from the edge of the target, which is especially useful for drop ceiling rail alignment, and the images can appear directly on the ends. These images may be viewed on the side of the target, which is useful for wallboard alignment. In this case the exit end can be beveled in such a way as to reflect the light beams onto the rear of a viewing screen formed on a side of one of the sheets.

It may also be desired that the images may be formed on the surface to be aligned. In that case, the exit ends may be formed with a notch-type configuration which is designed to focus and enhance the images at or in the plane of an external surface. Thus, with the notched edge placed against and perpendicular to a surface, the images will appear on the surface and can be viewed through the notch.

In the case where the image is to be viewed on the end or exit edge of the lightguide, opposite the curved edge, the length of the lightguide sheet is calculated so as to focus the images on its exit edge. The exit edge surface of the material is then made to be diffuse or a material that acts like a diffuser may be applied. This may be a conventional diffuser such as frosted plastic, or a preferential diffuser such as a hologram or diffractive optical element. As mentioned in the prior applications, the diffuser may be designed to direct the light more conveniently toward the viewer. Furthermore, the output surface may be angled or curved in a way to direct or focus the images in a particular way.

If it is desired to re-direct or enlarge the output images, the exit edges of the sheets can be formed to a curvature which functions as a diverging and/or re-directing lens, so as to enhance the viewing of the alignment indicating images. It is also possible that the exit edges may be formed to have optical power to enhance the resultant images and/or to cooperate with the optical power of the entrance optics. Thus, the exit edges can be curved transverse to the light guide sheets, such as to spread or converge the images sideways of the target, and/or the exit edges are curved along their length such as to produce a better focus and/or size of the images. This latter curvature can be designed and added in cooperation with the curvature(s) of the entrance edges of the target, such as to produce the desired images while reducing or simplifying the necessary curvature of the entrance edges.

DESCRIPTION OF THE PREFERRED EMBODIMENTS

Figure 1:
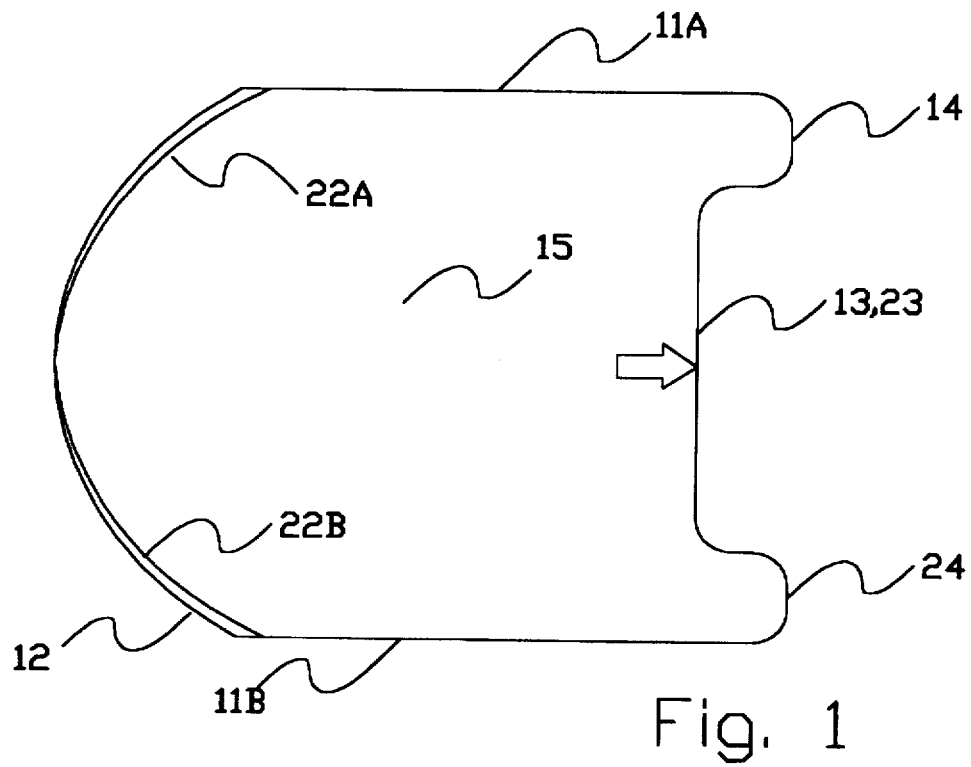
FIG. 1 is a side view of an embodiment of the invention.
Figure 2:
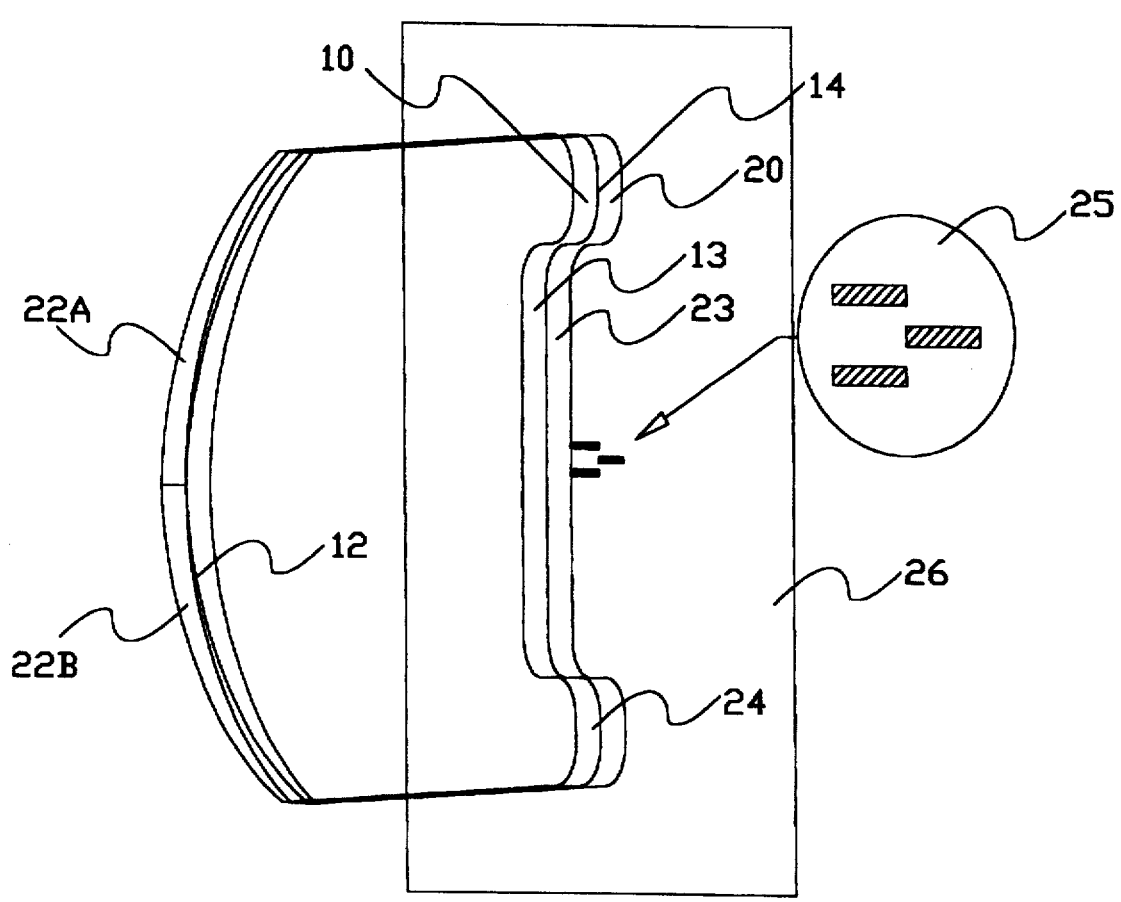
FIG. 2 is a perspective view of the embodiment illustrated in FIG. 1, including and enlargement of the images.

Referring to FIGS. 1 and 2, the improved and simplified target comprises two thin (e.g. ⅛th inch thick) plastic sheets 10 and 20. These sheets preferably are of the same uniform thickness and the material should be the same so as to have the same index of refraction. The material is chosen to provide a good light guide with minimal reflective loss, to be sufficiently low in cost and easy to form accurately, and having edges which are (or can be made) flat and perpendicular to the faces of the sheets. The material may be colored (e.g. dyed) to provide an optical filter which will reject unwanted light to which the sheets may be exposed, so as to enhance the contrast of the viewed images produced by the target.

Sheet 10 has top and bottom edges 11A, 11B, a curved entrance edge 12, and a notched rearward exit edge 13. The faces 15 are of identical shape. Entrance edge 12 is precisely shaped to form a lens which will focus an image on surface 26.

Sheet 20 has top and bottom edges 20A, 20B, an entrance edge 22 which is formed as two separate complementary lens surfaces 22A, 22B, which provide the function of a lens and axicon, and a notched exit edge 23. Faces 15 are of identical shapes and generally match the shape of sheet 10 except for the forward edges. The notches are sized and located so as to focus the images 25 from the three beams directed through the lightguides at a plane which is coincident with the plane of the rearward stand-off edges 14, 24 which are at the top and bottom of exit edges 13, 23. In use an observer will see the images on the surface 26 against which the rearward stand-off edges 14, 24 of the target are held.

The sheet may be a thicker single member and both curved edge formations formed, side-by-side, on the entrance edge, depending upon the manufacturing processes used to generate the curved entrance edges.

In either event, the notches may be omitted, and the exit edges 13A and 23A are made coincident with the focal plane of the entrance lens formations, and are provided with a diffusing surface, if it is desired to view the images by looking directly at such exit edge of the target. This embodiment is shown in FIGS. 3 and 4.

Figure 3:
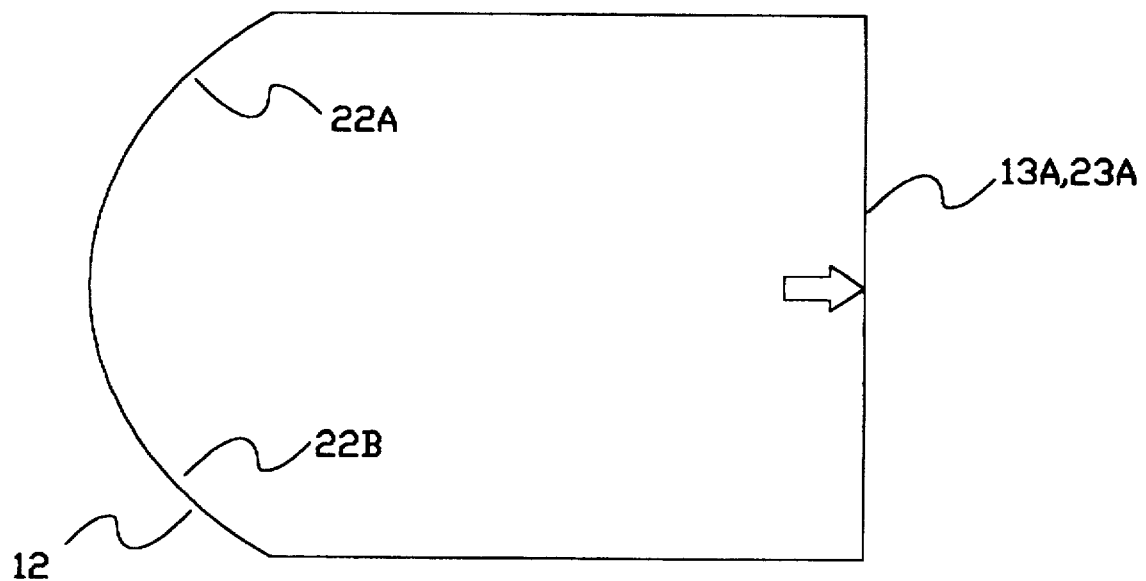
FIG. 3 is a side view of another embodiment.
Figure 4:
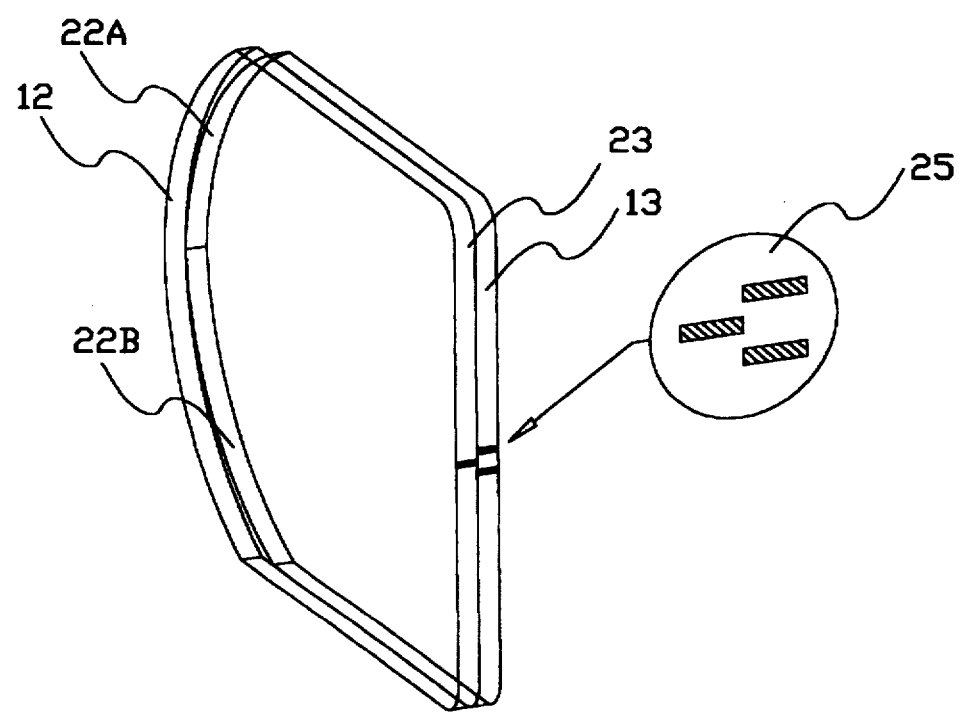
FIG. 4 is a perspective view of the embodiment illustrated in FIG. 3, including an enlargement of the images as viewed on the exit edges of the target.
Figure 5:
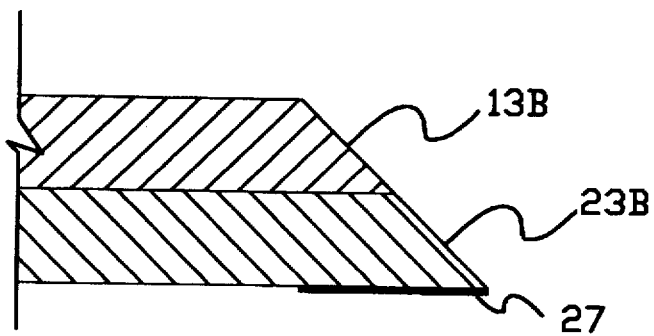
FIG. 5 is an enlarged partial cross-section view showing a modification of the embodiment illustrated in FIGS. 3 and 4, by formation of the exit edges as adjacent reflecting surfaces, directing the light beams to a viewing screen area on one face of the target.

A variation of the embodiment of FIGS. 3 and 4 is provided by forming exit edges as adjacent reflecting surfaces 13B, 23B (see FIG. 5), in which case a diffusing screen area 27 is formed on the side of the lightguide to enable viewing of the adjacent images from a side of the target.

Figure 6:
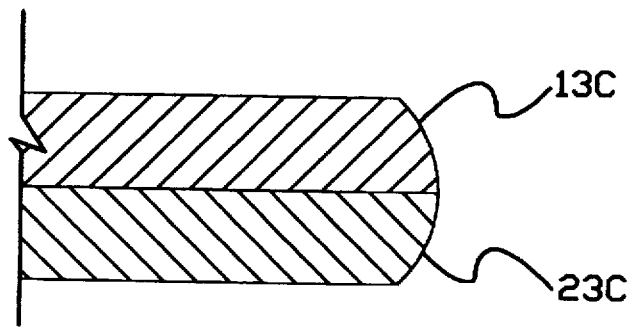
FIG. 6 is a partial sectional view showing a modification of the exit edges in the embodiment of FIGS. 1 and 2.
Figure 7:
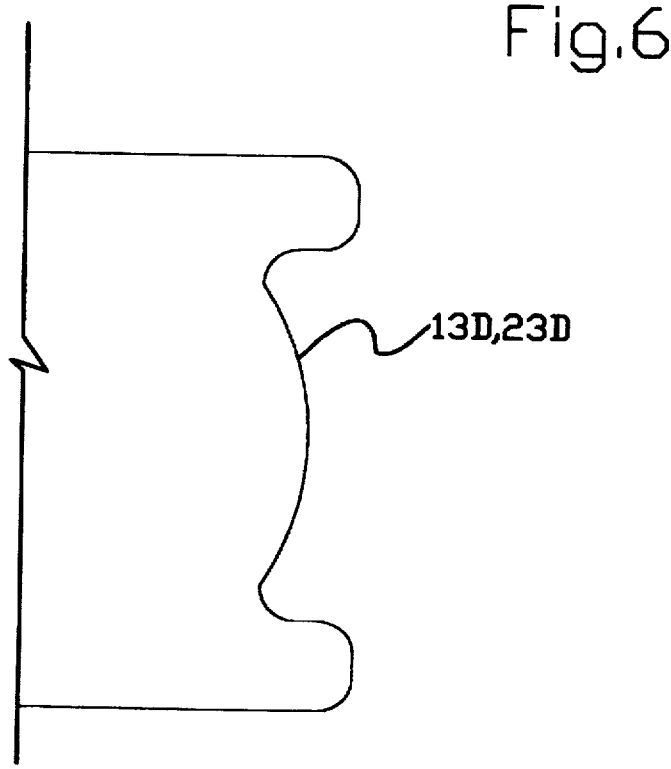
FIG. 7 is a partial view showing another modification of the exit edges of the embodiment shown in FIGS. 1 and 2.

In other embodiments (FIGS. 6 and 7) the exit edges 13, 23 and 13A, 23A can have optical power to enhance the resultant images and/or to cooperate with the optical power of the entrance optics. Thus, in FIG. 6 the exit edges 13C, 23C can be curved in a fashion transverse to the light guide sheets, such as to spread or converge the images sideways of the target. In the embodiment of FIG. 7, the exit edges 13D, 23D are curved along their length such as to produce a better focus and/or size of the images; this curvature can be designed and added in cooperation with the curvature(s) of the entrance edges of the target, such as to produce the desired images while reducing the necessary curvature of the entrance edges. For example, the axicon function can be designed into such a modified exit edge. This use of cooperative functions in the design of the entrance and exit edge curvatures can contribute to the over-all shortening of targets constructed according to this invention.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In a system for providing alignment marks derived from a light beam source directed along a predetermined path by locating the center of the beam as it is directed along such path, the improvement comprising a portable target body adapted to be located to intercept the beam, said target body including a generally rectangular optical sheet having relatively wide front and back surfaces and relatively narrower opposed first and second ends, said target body having means forming two parallel elongated waveguides extending from the first to the second ends, said waveguides each having separate and adjacent entrance edges and exit edges at said first and second ends, said entrance edges being adapted to intercept the beam, a lens and an axicon formed in the entrance edge of a first of said waveguides for receiving a light beam and for dividing the light beam impinging on said first waveguide into at least two component beam parts exiting the exit end of said first waveguide, a second lens formed in the second of said waveguides for directing a reference beam to the exit edge of said second waveguide, said target thereby producing adjacent visible images for comparison as to visual equality as to size and intensity.

2. A target as defined in claim 1, further including a viewing window on said exit edges, a reference indicator on said body located at a predetermined position with respect to said exit edges, said target body being adjustable with respect to the light beam at said entrance edges until the images from the divided beams appear equal as the input beam is passed by the center of said lens and said axicon, and the reference indicator being useful to mark a surface.

3. A target as defined in claim 1, wherein said waveguides are separate optical sheets onto which said entrance lenses are formed, said sheets being attached at their front and back surfaces forming the waveguides to transmit the divided light beams and the reference beam from said entrance edges to said exit edges.

4. A target as defined in claim 1, wherein said pair of waveguides have standoff edges on opposite sides of said exit edges to space said exit edges a predetermined distance away from a surface to be marked, such that the component beams and the reference beams are focused to form images in a plane coincident with said standoff edges.

5. A target for locating the center of a coherent light beam impinged repeatedly on said target, comprising a target body in the form of a pair of attached lightguides having side by side entrance lenses at one of its ends and an exit aperture at its other end, one of said lightguides including a beam splitting means to divide an entering beam into equal component beam parts, viewing exit edges at said exit aperture receiving the component beam parts and a reference beam in adjacent locations and producing adjacent images with the images from said component beams parts being on opposite sides of the image from said reference beam, whereby an observer can discern equality and inequalities of the adjacent images as the position of the target is moved to center said input aperture with respect to the input light beam so as to produce equal images from the component beams.

6. A target as defined in claim 5, further including means for directing the component and reference beams into said exit edges such that the component beams each produce an enhanced image on a viewing screen in predetermined alignment and visual equal intensity when the incoming light beam is centered with respect to said entrance lens.

7. A target as defined in claim 6, wherein said lightguides include standoff edges on said exit end thereof to space the exit edges from the plane defined by said standoff edges, whereby images can be formed in such plane using the surface to be marked as the viewing screen.

8. A target as defined in claim 6, wherein said lightguides have a viewing screen formed on said exit edges, said viewing screen including a diffusing area on which the images are visible.

9. A target as defined in claim 5 wherein said exit edges include an exit lens formation which enlarges the images in a direction transverse to said exit edges.

10. A target as defined in claim 6 wherein said exit edges include an exit lens formation which enlarges the images in a direction parallel to said exit edges.

11. A passive hand held target for locating the center of a light beam impinged repeatedly on said target as the target is held adjacent a surface being scanned, said target comprising a target body to be located at the surface, said target body being divided into two light guides, one of said light guides including a beam dividing entrance lens for receiving the input light beam impinging on said target and dividing the input beam into at least two component beam parts, the other of said light guides having a focusing entrance lens alongside said beam dividing entrance lens for receiving an input beam and forming it into a reference beam, diffuser means on an exit edge of said body providing a viewing screen for the reference beam and the component beam parts, said body providing parallel wave guide means for directing the divided parts of the light beam onto said viewing screen to produce visible adjacent images on said viewing screen for comparison as to visual equality, and for directing the reference beam onto said viewing screen to produce a visible reference image to one side of the other two images.

12. A target as defined in claim 11, said body including a reference indicator on said target body, said target body being locatable on the surface and adjustable with respect to the scanning light beam until the images from the divided beams appear equal as the beam is repeatedly passing the center of said lens and said axicon, and the reference indicator can be used to mark the surface.

13. A target as defined in claim 11, wherein said target body is a pair of optical blocks having an entrance dual lens and axicon formed as shaped regions in side by side fashion on an entrance end of said block to receive an input beam and to divide said beam into component parts in one block and a reference beam in the other block, said blocks transmitting the reference and component beams to the exit edges of said block to form adjacent images.

* * * * *